(12) United States Patent
Motoyoshi

(10) Patent No.: US 6,801,785 B2
(45) Date of Patent: Oct. 5, 2004

(54) TRANSMISSION POWER CONTROL METHOD IN CDMA SYSTEM

(75) Inventor: Gen Motoyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 631 days.

(21) Appl. No.: 09/888,510

(22) Filed: Jun. 26, 2001

(65) Prior Publication Data

US 2002/0013158 A1 Jan. 31, 2002

(30) Foreign Application Priority Data

Jun. 27, 2000 (JP) .................................... 2000-193125

(51) Int. Cl.$^7$ ................................................ H04B 7/00
(52) U.S. Cl. ..................................... 455/522; 455/574
(58) Field of Search ........................ 455/522, 69, 13.4, 455/515, 574, 343.1, 343.4, 127.5

(56) References Cited

U.S. PATENT DOCUMENTS

| | | | |
|---|---|---|---|
| 5,590,409 A | 12/1996 | Sawahashi et al. | 455/69 |
| 6,519,235 B1 * | 2/2003 | Kim et al. | 370/331 |
| 6,580,699 B1 * | 6/2003 | Manning et al. | 370/331 |
| 2001/0012276 A1 | 8/2001 | Tsunehara et al. | 370/318 |
| 2001/0050907 A1 * | 12/2001 | Madour et al. | 370/329 |
| 2002/0052204 A1 * | 5/2002 | Bender et al. | 455/450 |

FOREIGN PATENT DOCUMENTS

| | | |
|---|---|---|
| EP | 1 059 736 A2 | 12/2000 |
| JP | 8-032514 | 2/1996 |
| JP | 8-125604 | 5/1996 |
| JP | 10-065610 | 3/1998 |
| JP | 10-173594 | 6/1998 |
| JP | 11-145901 | 5/1999 |
| JP | 2000-040999 | 2/2000 |
| JP | 2000-078078 | 3/2000 |
| WO | WO 00/18034 A1 | 3/2000 |
| WO | WO 00/62456 A1 | 10/2000 |

* cited by examiner

Primary Examiner—Nick Corsaro
Assistant Examiner—Tan Trinh
(74) Attorney, Agent, or Firm—Foley & Lardner LLP

(57) ABSTRACT

Before a mobile station is in dormancy, power control channels of forward and reverse links are established between the mobile station and a base station independently of traffic channels of forward and reverse links. When the mobile station is in dormancy, a dormant power control signal is transmitted from the base station to the mobile station through the power control channel of the forward link. Then a dormant power control process is carried out at the mobile station, in accordance with the dormant power control signal transmitted from the base station, to produce a reference data signal subject to the dormant power control process, In response to the power-controlled data signal, the base station produces the dormant power control signal in accordance with a reception level of the reference data signal. Thus, closed loop power control for dormant mobile station is achieved.

10 Claims, 5 Drawing Sheets

TRANSMISSION POWER CONTROL METHOD IN CDMA SYSTEM

BACKGROUND OF THE INVENTION

This invention relates to a transmission power control method on CDMA (Code Division Multiple Access) system, and apparatuses for embodying the method.

In the field of cellular telecommunications, recent techniques have been directed to CDMA system. In a CDMA system, a base station (BS) provides a service area or a cell-site (or a short cell-site) and communicates with multiple mobile stations (MS) of users existing on the cell-site wherein the communication from each mobile station to base station is called uplink or reverse link communication while the communication from base station to each mobile station is called downlink or forward link communication. In either the uplink and downlink communications, each mobile station uses a channel identified by a uniquely assigned digital code. Therefore, the reverse link and the forward link communications can be simultaneously carried out while sharing the same wideband frequency spectrums.

In a CDMA cellular system, transmission power levels of the mobile stations, especially in reverse link communication, become important. In reverse link communication, a base station simultaneously receives the signals from many different mobile stations at the same frequency. The CDMA demodulation processes taken into account, it is necessary that the signal received at the base station from each mobile station be as close as possible to single level. Conversely, the signal from one mobile station overwhelms the signal from another mobile station. This problem is well known as near-far problem.

To resolve the near-far problem, transmission power control of each mobile station is carried out in a CDMA cellular system so that the signal level received at the base station from each mobile station is as close as possible to a single predetermined level. Generally, the transmission power controls processes are categorized into an open loop power control process and a closed loop power control process. The former is suited only for median compensation in short period, while the latter can compensate instantaneous fluctuation of transmission power. The latter are specified, for example, in the Telecommunications Industry Association/Electronic Industries Association (TIA/EIA) IS-95B standard.

In IS-95B power control process, the base station transmits transmission power control bits for mobile stations in forward link communication. Each transmission power control bit indicates "increase" or "decrease" of the transmission power when having a value "1" or a value "0." Specifically, a single transmission power control bit is transmitted every 1.25 ms, and step sizes of the power control are three, namely 1 dB, 0.5 dB, and 0.25 dB.

In IS-95B standard, as the traffic channels, a supplemental channel (SCH) may be used in addition to a fundamental channel (FCH). The fundamental channel is a basic traffic channel and always exists during the normal data transmission between the mobile station and the base station. On the other hand, the supplemental channel is added and used when the amount of the transmission data on communication between the mobile station and the base station becomes larger than a predetermined data amount which is allowed by the fundamental channel. Plural supplemental channels may be used in correspondence with the amount of the transmission data. It is noted here that the aforesaid transmission power control bits are used not for supplemental channel (SCH) but only for fundamental channel (FCH), in IS-95B standard.

In addition, packet communication compliant with IS-707-A can be build on an IS-96B CDMA system. In the packet communication, when the mobile station does not carry out data transmission/reception for a certain period, the mobile station is forced to be in dormancy, and the traffic channels for the dormant mobile station are opened or broken off. As the result of the traffic channels broken off, the aforesaid transmission power control bits are not transmitted to the mobile station that is in dormancy.

It is noted here that the mobile station can travel even in dormancy and the travel of the mobile station might cause the condition for the transmission power to change, However, the above-mentioned IS-707-A packet communication on an IS-95B system can not handle the change of the condition for the transmission power, because of no traffic channel during dormancy of the mobile station.

SUMMARY OF THE INVENTION

This invention therefore provides a transmission power control method which is carried out even if the mobile station is in dormancy.

According to one aspect of this invention, a transmission power control method comprises the following operations. Herein, the transmission power control method is carried out in CDMA system which comprises a base station providing a service area and a mobile station existing on the service area. In the CDMA system, the base station and the mobile station communicate with each other on the traffic channels of forward and reverse links during normal data transmission In the transmission power control method according to one aspect of this invention, before the mobile station is in dormancy, power control channels of forward and reverse links are established between the mobile station and the base station. The power control channels of forward and reverse links are independent of the traffic channels of forward and reverse links, and are used only when the mobile station is in dormancy.

When the mobile station is in dormancy, a dormant power control signal is transmitted from the base station to the mobile station through the power control channel of the forward link. Then a dormant power control process is carried out at the mobile station, in accordance with the dormant power control signal transmitted from the base station, so that the mobile station produces a reference data signal which is subject to the dormant power control process. The power-controlled data signal is transmitted from the mobile station to the base station, so that the base station produces the dormant power control signal in accordance with a reception level of the reference data signal. Thus, closed loop power control for dormant mobile station is achieved.

DESCRIPTION OF THE PREFERRED EMBODIMENTS

Figure 1:
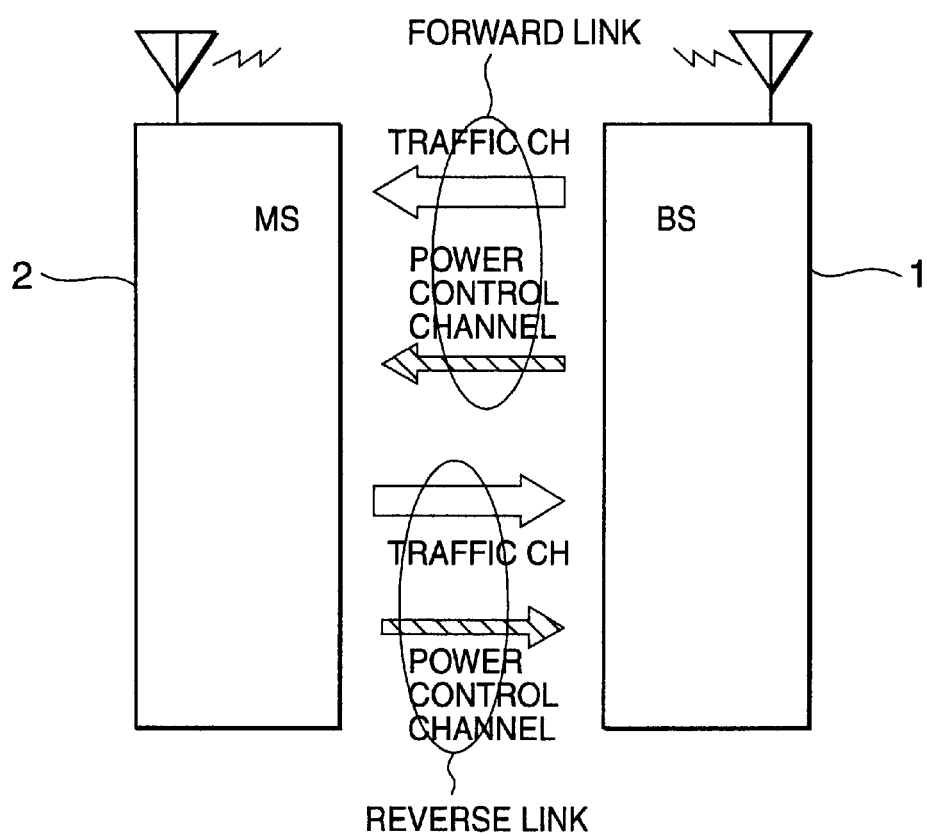
FIG. 1 is a block diagram schematically showing a mobile station and a base station according to an embodiment of this invention.

A CDMA system according to an embodiment of the present invention is schematically shown in FIG. 1 and includes a base station (BS) 1 and a mobile station (MS) 2. On upper side of the base station 1, a base station controller (BSC) and a mobile-services switching center (MSC) are arranged. The mobile service switching center is connected to the public switched telephone network (PSTN). The base station controller may be connected to the Internet. For the sake of clarity detail descriptions about the base station controller, the mobile-services switching center, the PSTN, and the Internet are omitted.

Referring to FIG. 1, between the mobile station and the base station, traffic channels (traffic CH) and power control channels (PC-CH) are established. In this embodiment, the traffic channels are provided only when the mobile station 2 is in activation, and are opened or broken off when the mobile station 2 is in dormancy. On the other hand, the power control channels are always provided between the mobile station and the base station, in this embodiment. Specifically, the mobile station 2 shares the power control channels with other mobile stations which exist on an service area provided by the base station 1, in this embodiment.

Figure 2:
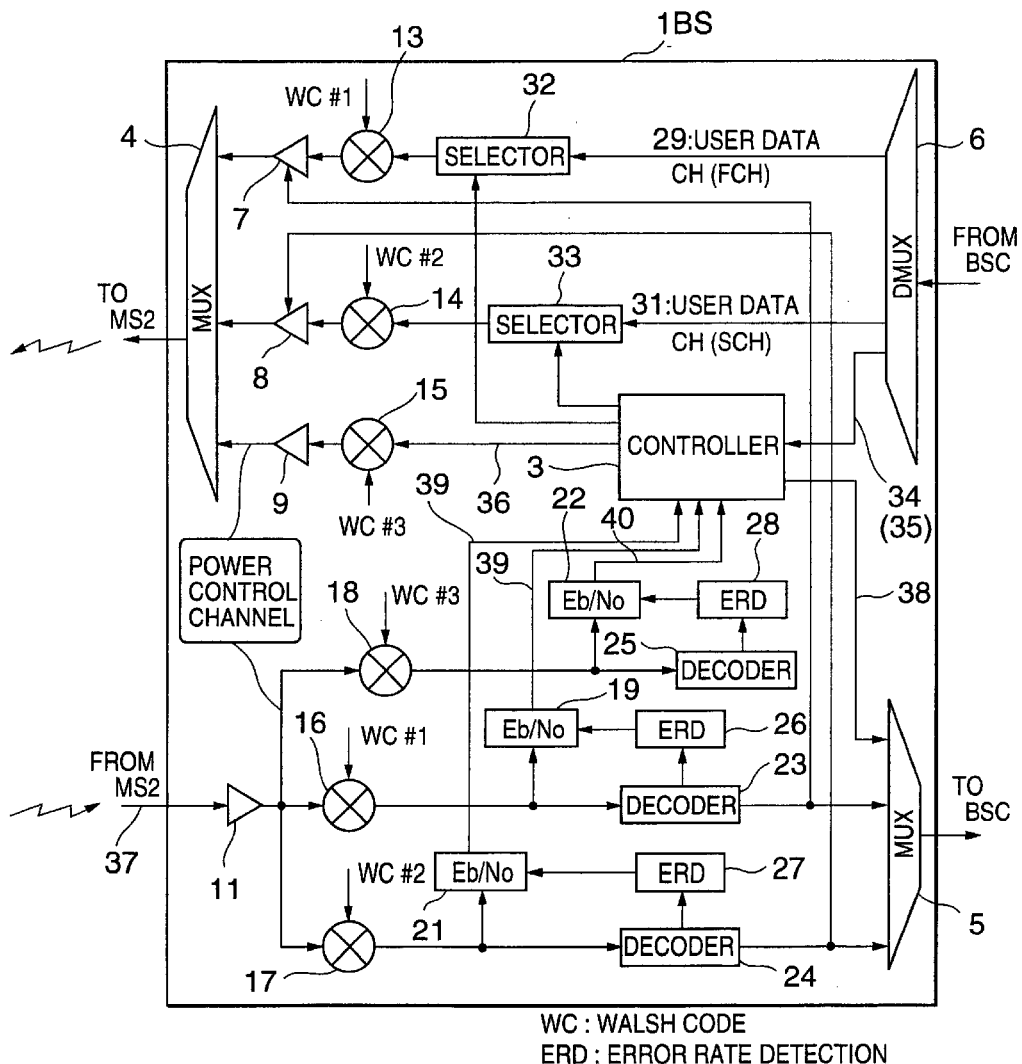
FIG. 2 shows an example of a base station illustrated in FIG. 1.

Referring to FIG. 2, the base station 1 comprises a controller 3, a multiplexer (MUX) 4, a multiplexer (MUX) 5, and a demultiplexer (DMUX) 6. The multiplexer 4 is connected to the mobile station 2, in view of radio communication. The multiplexer 5 and the demultiplexer 6 are connected to the base station controller and to the controller 3.

The illustrated base station 1 further comprises first to third gain controllers 7, 8, 9, first to third multipliers 13, 14, 15, and first and second selectors 32, 33. The first to third gain controllers 7, 8, 9 are coupled to the multiplexer 4. The first to third multipliers 13, 14, 15 are coupled to the first to third gain controllers 7–9, respectively. The third multiplier 15 is also coupled to the controller 3, the first and second multipliers 13, 14 are also coupled to the first and second selectors 32, 33, respectively. The first and second selectors 32, 33 also coupled to the controller 3 and the demultiplexer 6.

The illustrated base station 1 also comprises, a fourth gain controller 11, fourth to sixth multipliers 16, 17, 15, first to third Eb/No measurers 19, 21, 22, first to third decoders 23, 24, 25, and first to third ERD (Error Rate Detection) units 26, 27, 28. The fourth gain controller 11 is coupled to the mobile station 2 on the radio communication. The fourth to sixth multipliers 16, 17, 18 are coupled to the fourth gain controller 11. The first to third Eb/No measurers 19, 21, 22 are coupled to the fourth to sixth multipliers 16, 17, 18, respectively, and are also coupled to the controller 3. The first to third decoders 23, 24, 25 are coupled to the fourth to sixth multipliers 16, 17, 18, respectively. The first and second decoders 23 and 24 are also connected to the first and second gain controllers 7, 8 and to the multiplexers 5. The first to third ERD units 26, 27, 28 are coupled to the first to third decoders 23, 24, 25, and are also coupled to the first to third Eb/No measurers 19, 21, 22, respectively.

Figure 3:
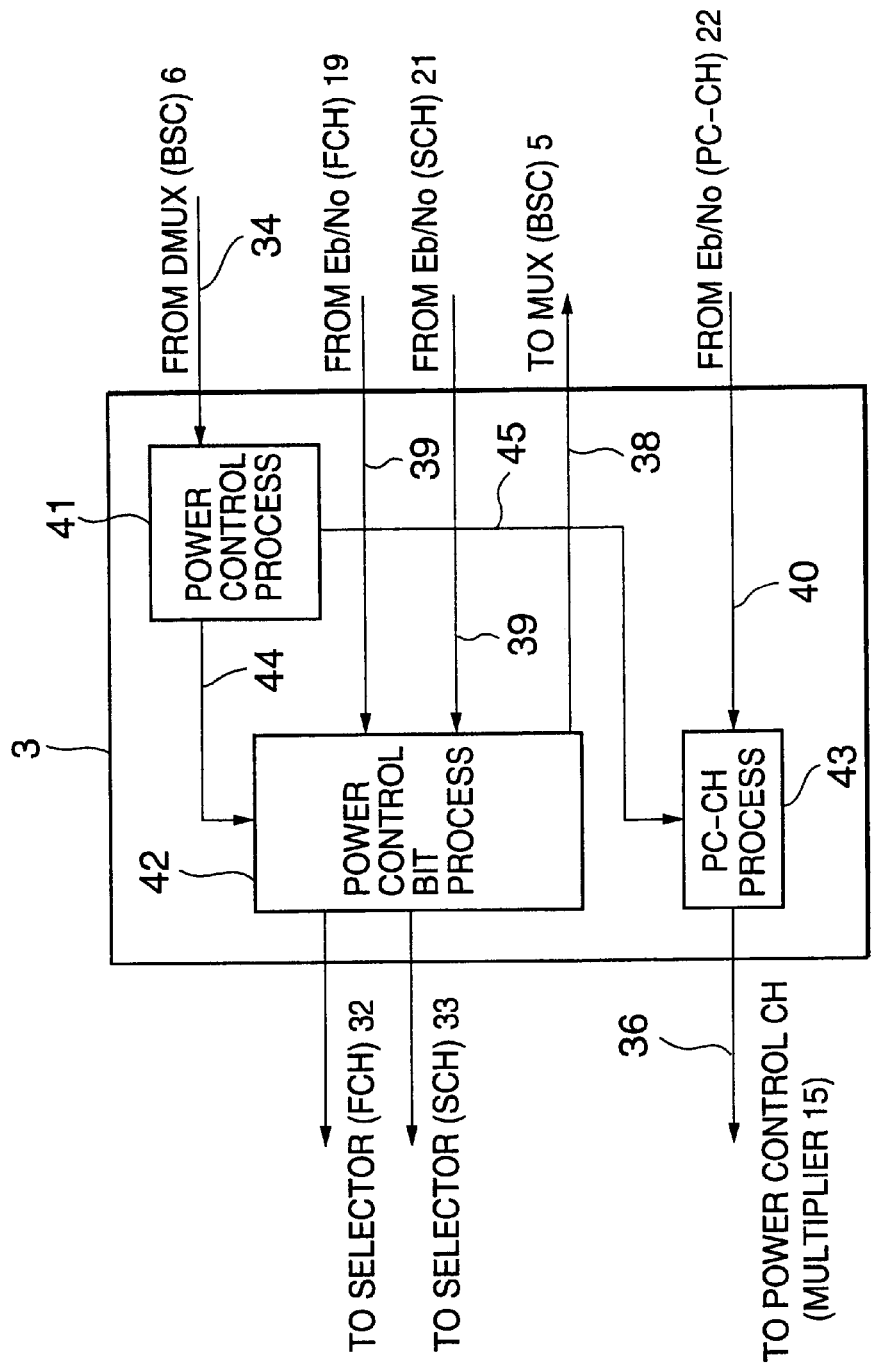
FIG. 3 shows an example of a controller illustrated in FIG. 2.

The controller 3 of the base station 2 illustrated in FIG. 2 comprises a power control process unit 41, a power control bit process unit 42, and a power control channel process unit 43, as shown in FIG. 3. The power control process unit 41 is connected to the demultiplexer 6, the power control bit process unit 49, and the power control channel process unit 43. The power control bit process unit 42 is also connected to the first and second Eb/No measurers 19, 21, the first and second selectors 32, 33, and the multiplexer 5. The power control channel process unit 43 is also connected to the third Eb/No measurer 22 and the third multiplier 15.

Figure 4:
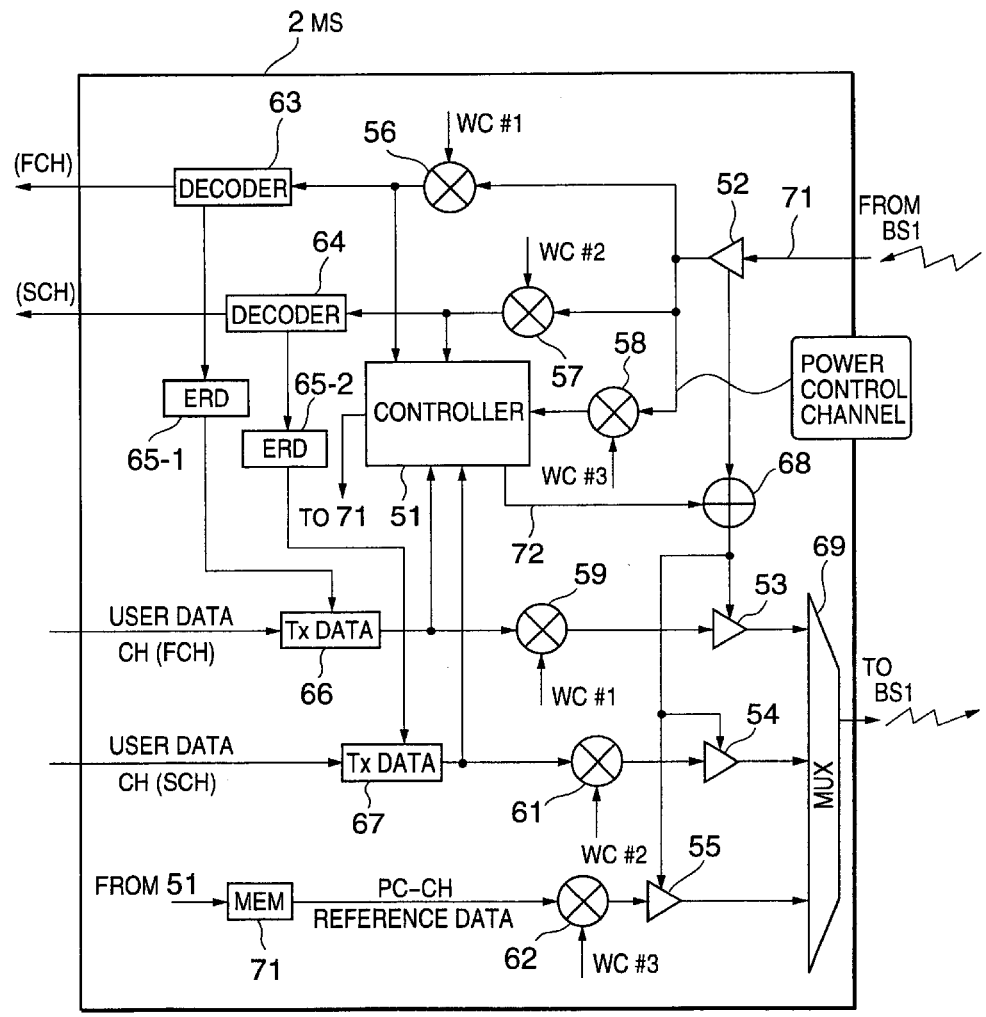
FIG. 4 shows an example of a mobile station illustrated in FIG. 1.

Referring to FIG. 4, the mobile station 2 comprises a controller 51, a first gain controller 52, first to third multipliers 56, 57, 58 and first and second decoders 63, 64. The first gain controller 52 is connected to the base station 1 on the radio communication. The first to third multipliers 56, 57, 58 are coupled to the first gain controller 52 and the controller 51. The first and second decoders 63, 64 are coupled to the first and second multipliers 56, 57 respectively.

The illustrated mobile station 2 further comprises first and second ERD units 65-1, 65-2, first and second transmission data process units 66, 67, a memory 71 storing reference data, fourth to sixth multipliers 59, 61, 62, second to fourth gain controllers 53, 54, 55, an adder 68, and a multiplexer 69. The first and second ERD units 65-1, 65-2 are coupled to the first and second decoders 63, 64. The first and second transmission data process units 66, 67 are also coupled to the fourth and fifth multipliers 59, 61, respectively, and are further coupled to the controller 51. The memory 71 is coupled to the controller 51 and the sixth multiplier 62. The fourth to sixth multipliers 59, 61, 62 are also coupled to the second to fourth gain controller 53, 54, 55. The adder 68 is coupled to the first gain controller 52, the controller 51, and is further coupled to the second to fourth gain controller 53, 54, 55. The second to fourth gain controller 53, 54, 55 are also coupled to the multiplexer 69. The multiplexer 69 is connected to the base station 1 on the radio communication.

The controller 51 of the mobile station 2 illustrated in FIG. 4 comprises a dormant controller 81, a power control process unit 82, and a power control channel process unit 83. The dormant controller 81 is coupled to the first and second multipliers 56, 57, the first and second transmission data process units 66, 671 and the power control process unit 82. The power control channel process unit 83 is coupled to the third multiplier 58 and the power control process unit 82. The power control process unit 82 is also coupled to the adder 68.

With the above-mentioned structure, the base station 1 and the mobile station 2 operate as follows. In the followings, not only a fundamental channel (FCH) but also a supplemental channel (SCH) are used on communication between the base station 1 and the mobile station 2. However, the supplemental channel may not be used.

When the base station controller transmits data, the base station 1 receives the data on the demultiplexer 6, and the demultiplexer 6 demultiplexes the received data into first downlink user data (FCH) 29, second downlink user data (SCH) 31, power control channel data 34. The first downlink user data 29 are delivered into the first selector 32, while the second downlink user data 31 are delivered into the second selector 33. The power control channel data 34 include power control information 35 indicating whether each of the mobile station 2 and other mobile stations is in dormancy or not. The power control channel data 34 are delivered into the controller 3.

The first and second selectors 32, 33 also receive transmission power control bits from the controller 3, and select the first and second downlink user data 29, 31 and the transmission power control bits. That is, the first and second selectors 32, 33 add the transmission power control bits to the first and second downlink user data 29, 31. In this embodiment, the transmission power control bits are similar to ones of IS-95B, and each of the transmission power control bits indicates either "increase" or "decrease" of the transmission power. The outputs of the first and second selectors 32, 33 are delivered into the first and second multipliers 13, 14 and are multiplied by the first and second Walsh codes #1, #2, as the spread codes for the fundamental channel and the supplemental channel in this embodiment. The controller 3 also delivers into the third multiplier 15 a power control channel frame 36 as a manner discussed later. The third multiplier 15 multiplies the power control channel frame 36 by the third Walsh code #3, as the spread code for the power control channel in this embodiment. The outputs of the first to third multipliers 13, 14, 15 are subject to gain controls at the first to third gain controller 7, 8, 9, and then are multiplexed at the multiplexer 4 so as to be transmitted into the mobile station 2.

It is noted here that the gain controls at the first and second gain controller 7, 8 depend on the decode result that the first and second decoder 23, 24 decode reverse link communication signals as mentioned later. That is, the first and second gain controller 7, 8 carry out open loop transmission power control of forward link, together with the first and second decoder 23, 24.

On the other hand, when the mobile station transmits data, the base station 1 receives the data on the fourth gain controller 11. The data received from the mobile station 2 are subject to gain control at the fourth gain controller 11, and then are delivered into the fourth to sixth multipliers 16, 17, 18. The fourth to sixth multipliers 16, 17, 18 carry out the multiplication process, by using the first to third Walsh codes #1, #2, #3 which are also used at the first to third multipliers 13, 14, 15, as mentioned above. Thereby, the fourth to sixth multipliers 16, 17, 18 extract, as first to third extracted data, data which relate to first uplink user data (FCH), second uplink user data (SCH), and power-controlled data signal (PC-CH), respectively. The power-controlled data signal (PC-CH) is subject to dormant power control process at the mobile station 2 if the mobile station 2 is in dormancy, as mentioned later.

The first to third extracted data are delivered into the first to third Eb/No measurers 19, 21, 22 and the first to third decoders 23, 24, 25. The first to third decoders 23, 24, 25 decode the first to third extracted data into the first uplink user data (FCH), the second uplink user data (SCH), and the power-controlled data signal (PC-CH). The outputs of the first to third decoders 23, 24, 25 are delivered into the first to third ERD units 26, 27, 28 and are subject to ERD processes. The first to third Eb/No measures 19, 21, 22 also receive the outputs of the first to third ERD units 26, 27, 28. Each of the first to third Eb/No measures 19, 21, 22 measures an Eb/No value of a corresponding one of the reception signals, and produces reception power information signals 39, 39, 40, on the basis of each output the first to third ERD units 26, 27, 28 and each of the first to third extracted data delivered from the first to third multipliers 16, 17, 18. The reception power information signals 39, 39, 40 are delivered into the controller 3. Among them, the reception power information signal 40 is for the dormant mobile station. The reception power information signals 39, 39, 40 are used at the controller 3 for the closed loop transmission power control of reverse link, as discussed later.

The outputs of the first and second decoders 23, 24 are also delivered into the multiplexer 5. If the controller 3 outputs an alarm information signal 38, as mentioned later, the multiplexer 5 also receives the alarm information signal. The multiplexer 5 multiplexes the outputs of the first and second decoders 23, 24 and the alarm information signal 38 into a multiplexed data signal to be transmitted into the base station controller.

In detail, within the controller 3, the following operations are carried out.

Referring to FIG. 3, the power control channel data 34 are input into the power control process unit 41. In response, the power control process unit 41 produces a first control signal 44 and a second control signal 45. The first control signal 44 is for the transmission power control bits added to the user channels (FCH, SCH), while the second control signal 45 is for the power control channel. Both include the power control information 35. The first and second control signals 44, 45 are delivered into the power control bit process unit 42 and the power control channel process unit 43, respectively.

The power control bit process unit 42 receives the reception power information signals 39 from the first and second Eb/No units 19, 21, and checks whether the mobile station 2 is in activation. If the mobile station 2 is in activation, the power control bit process unit 42 produces the transmission power control bits according to the first control signal 44. Thus the power control bit process unit 42 produces the transmission power control bits not only for the fundamental channel but also for the supplemental channel. The transmission power control bits are delivered into the first and second selectors 32, 33.

In addition, the power control bit process unit 42 checks whether the power control information 35 included in the power control channel data 34 is coincident with the actual condition of the mobile station 2, on the basis of the reception power information signals 39 received from the first and second Eb/No units 19, 21. If the power control information 35 is not coincident with the actual condition of the mobile station 2, the power control bit process unit 42 produces the alarm signal 38 to output it into the base station controller through the multiplexer 5. That is, the alarm signal indicates that the power control information 35 transmitted from the base station controller is not coincident with the actual condition of the mobile station 2.

The power control channel process unit 43 receives the reception power information signal 40 from the third Eb/No unit 22, and produces, in accordance with the second control signal 45, the power control channel frame 36 including a dormant power control signal for dormant mobile station. The power control channel frame 36 is delivered into the third multiplier 15. Thus, if the mobile station 2 is in dormancy, the transmission power control is carried out through the power control channel, In this embodiment, the power control channel is shared by the mobile station 2 and the other mobile station as mentioned above, and therefore, the power control channel frame 36 may include the dormant power control signals corresponding to a plurality of the dormant mobile stations.

When the mobile station 2 receives the data on the first gain controller 52, the first gain controller 52 carries out gain control with a predetermined gain, and delivers gain-controlled data into the first to third multipliers 56, 67, 58. The first to third multipliers 56, 57, 58 multiply the gain-controlled data by the first to third Walsh code #1, #2, #3 which are also used at the first to third multipliers 13, 14, 15 of the base station 1, as discussed above. Thereby, if the data received from the base station 1 are for the user data, the first multiplier 56 extracts data relating the first downlink user data (FCH) as a first extracted data, and the second multiplier 57 extracts data relating the second downlink user data (SCH) as a second extracted data. The first and second extracted data are delivered into the controller 51, and are used at the controller 51 for a dormant power control, as discussed later. Also the first and second extracted data are delivered into the first and second decoders 63, 64, and are decoded into the first and second downlink user data (FCH, SCH). If the data received from the base station 1 are for the power control channel frame 36, the third multiplier 58 extracts data relating the dormant power control signal as a third extracted data. The third extracted data are delivered into the controller 51.

In activation of the mobile station 2, the outputs of the first and second decoders 63, 64 are delivered into the first and second ERD units 65-1, 65-2 and are subject to ERD processes. The outputs of the first and second ERD units 65-1, 65-2 are delivered into the first and second transmission data process units 66, 67. The first and second transmission data process units 66, 67 receive first and second uplink user data (FCH, SCH), and carry out the open loop transmission power controls of reverse links on the first and second uplink user data, by the use of the outputs of the first and second ERD units 65-1, 65-2. The outputs of the first and second transmission data process units 66, 67 are delivered into the controller 51 and are used at the controller 51 for a dormant power control, as discussed later. The outputs of the first and second transmission data process units 66, 67 are also delivered into the fourth and fifth multipliers 59, 61, and are multiplied by the first and second Walsh codes #1, #2 which are also used at the first and second multipliers 56, 57, as discussed above. The outputs of the fourth and fifth multipliers 59, 61 are delivered into the second and third gain controller 53, 54.

In dormancy of the mobile station 2, the reference data are read out of the memory 71 under the control of the controller 51, and are delivered into the sixth multiplier 62. For example, the reference data have a fixed-pattern such as a simple alternating pattern. The sixth multiplier 62 multiplies the reference data by the third Walsh code #3 which is used at the third multiplier 58. The output of the sixth multiplier 62 is delivered into the fourth gain controller 55.

The controller 51 produces a closed loop power control information 72, on the basis of the outputs of the first to third multipliers 56, 57, 58, and the outputs of the transmission data process units 66, 67. The closed loop power control information 72 is delivered into the adder 68. The adder 68 also obtains the predetermined gain from the first gain controller 52, and adds the closed loop power control information 72 to the predetermined gain of the first gain controller 52, so as to produce gain for closed loop power control, The gain for closed loop power control is delivered into the second to fourth gain controller 53, 54, 55. The second to fourth gain controller 53, 54, 55 carry out gain controls for the outputs of the fourth to sixth multipliers 59, 61, 62, by using the gain for closed loop power control. The outputs of the second to fourth gain controller 53, 54, 55 are multiplexed at the multiplexer 69, and then are transmitted as the power-controlled data signal to the base station 1.

In detail, within the controller 51, the following operations are carried out.

Figure 5:
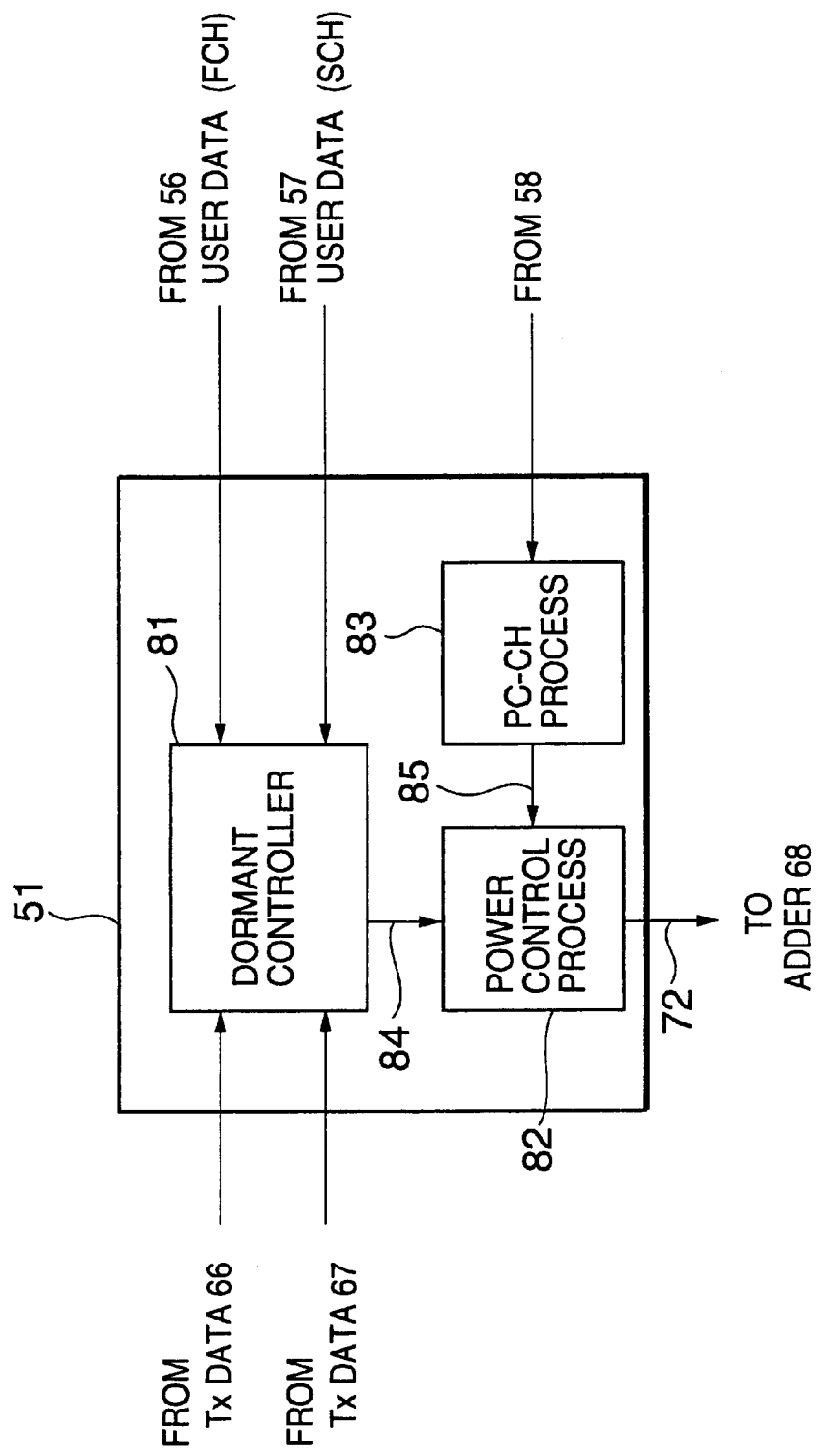
FIG. 5 shows an example of a controller illustrated in FIG. 4.

Referring to FIG. 5, the dormant controller 81 judges whether the mobile station 2 is in dormancy, on the basis of the outputs of the first and second multipliers 56, 57, and the outputs of the transmission data process units 66, 67. If the mobile station 2 is in dormancy, the dormant controller 81 produces a control signal 84 indicating the dormancy of the mobile station 2 and delivers it into the power control process unit 82. If the mobile station is in activation, the dormant controller 81 further judges whether to increase or decrease he transmission power, on the basis of the majority in all of the transmission power control bits which are not only for the fundamental channel but also for the supplemental channel and which are included in the first and second extracted data corresponding to the first and second downlink user data (FCH, SCH). In this event, the dormant controller 81 produces the control signal 84 indicating either "increase" or "decrease" of the transmission power.

The power control channel process unit 83 receives the output of the third multiplier 58 and extracts the dormant power control signal for the mobile station 2, if the dormant power control signal for the mobile station 2 is included in the power control channel frame 36. In this event, the power control channel process unit 83 also produces an enable signal 85 to enable the power control process unit 82 to carry out the dormant power control process. If the dormant power control signal for the mobile station 2 is not included in the power control channel frame 36, the power control channel process unit 83 also produces a disable signal 85 to disable the power control process unit 82 to carry out the dormant power control process.

The power control process unit 82 produces the closed loop power control information 72 on the basis of the control signal 84 and the enable/disable signal 85. Specifically, the power control process unit 82 produces the closed loop power control information 72 for normal power control process, if the control signal 84 indicates either "increase" or "decrease" of the transmission power and if a signal delivered from the power control channel process unit 83 is the disable signal 85. On the other hand, the power control process unit 82 produces the closed loop power control information 72 for the dormant power control process, if the control signal 84 indicates the dormancy of the mobile station 2 and if a signal delivered from the power control channel process unit 83 is the enable signal 85.

While the invention has been particularly shown and described with respect to preferred embodiments thereof it will be understood by those skilled in the art that changes in form and details may be made therein without departing from the scope and spirit of the invention. For example, the base station 1 illustrated in FIGS. 2 and 3 comprises a set of components only for the mobile station 2 in the above-mentioned embodiment. However, since it is for the sake of clarity, the base station 1 can comprise other sets of components for other mobile station.

What is claimed is:

1. A method for controlling transmission power in CDMA system which comprises a base station providing a service area and a mobile station existing on the service area and in which the base station and the mobile station communicate with each other on the traffic channels of forward and reverse links during normal data transmission, the method comprising:

before the mobile station is in dormancy, establishing power control channels of forward and reverse links between the mobile station and the base station, the power control channels of forward and reverse links being independent of the traffic channels of forward and reverse links, the power control channels being used only when the mobile station is in dormancy; and when the mobile station is in dormancy,
transmitting a dormant power control signal from the base station to the mobile station through the power control channel of the forward link;
carrying out at the mobile station a dormant power control process according to the dormant power control signal transmitted from the base station, so as to produce a reference data signal which is subject to the dormant power control process; and
transmitting the power-controlled data signal from the mobile station to the base station, so that the base station produces the dormant power control signal in accordance with a reception level of the reference data signal, and thereby, closed loop power control for dormant mobile station is achieved.

2. A transmission power control method as claimed in claim 1, wherein the reference data signal is produced from a fixed-pattern data only for use in the closed loop power control for dormant mobile station.

3. A transmission power control method as claimed in claim 1, wherein the power control channels always exist within the service area, the mobile station shares the power control channels with other mobile stations existing on the service area.

4. A transmission power control method as claimed in claim 1, further comprising:

during the normal data transmission,
transmitting transmission power control bits from the base station to the mobile station through the traffic channel of the forward link;
carrying out at the mobile station a normal power control process for data to be transmitted to the base station, in accordance with the transmission power control bits transmitted from the base station, so as to produce a power-controlled data signal from the data to be transmitted to the base station; and transmitting the power-controlled data signal from the mobile station to the base station, so that the base station produces the transmission power control bits in accordance with a reception level power of the power-controlled data signal, and thereby, closed loop power control for activated mobile station is achieved.

5. A transmission power control method as claimed in claim 4, wherein each of the transmission power control bits is for designating either an increase or a decrease of transmission power of the mobile station.

6. A transmission power control method as claimed in claim 5, the CDMA system using, as the traffic channels, an at least one supplemental channel in addition to a fundamental channel when amount of data transmitted on communication between the mobile station and the base station become larger than a predetermined data amount, wherein:

the transmission power control bits are transmitted not only for the fundamental channel but also for the supplemental channel; and the power-controlled data signal has power which is either increased or decreased in the normal power control process according to majority in all of the transmission power control bits of the fundamental channel and the supplemental channel.

7. A CDMA system embodying a transmission power control method as claimed in claim 1, and comprising the mobile station and the base station.

8. A mobile station for use in a CDMA system embodying a transmission power control method as claimed in claim 1.

9. A base station for use in a CDMA system embodying a transmission power control method as claimed in claim 1.

10. A method for controlling transmission power in CDMA system which comprises a base station providing a service area and a mobile station existing on the service area and in which the base station and the mobile station communicate with each other on the traffic channels of forward and reverse links during normal data transmission, the method comprising:

before the mobile station is in dormancy, establishing power control channels of forward and reverse links between the mobile station and the base station, the power control channels of forward and reverse links being independent of the traffic channels of forward and reverse links, the power control channels being used only when the mobile station is in dormancy; and when the mobile station is in dormancy, breaking off the traffic channels of forward and reverse links;

transmitting a dormant power control signal from the base station to the mobile station through the power control channel of the forward link;

carrying out at the mobile station a dormant power control process according to the dormant power control signal transmitted from the base station, so as to produce a reference data signal which is subject to the dormant power control process; and transmitting the power-controlled data signal from the mobile station to the base station, so that the base station produces the dormant power control signal in accordance with a reception level of the reference data signal, and thereby, closed loop power control for dormant mobile station is achieved.

* * * * *